(12) United States Patent
Morimura et al.

(10) Patent No.: US 7,733,865 B2
(45) Date of Patent: Jun. 8, 2010

(54) COMMUNICATION APPARATUS AND METHOD

(75) Inventors: Kazuhiko Morimura, Tokyo (JP); Jun Kawashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 12/066,643

(22) PCT Filed: Oct. 19, 2006

(86) PCT No.: PCT/JP2006/321311

§ 371 (c)(1),
(2), (4) Date: Mar. 12, 2008

(87) PCT Pub. No.: WO2007/052518

PCT Pub. Date: May 10, 2007

(65) Prior Publication Data

US 2009/0232162 A1 Sep. 17, 2009

(30) Foreign Application Priority Data

Nov. 2, 2005 (JP) .............................. 2005-319801

(51) Int. Cl.
*H04L 12/28* (2006.01)
*H04J 3/24* (2006.01)
(52) U.S. Cl. .................. 370/392; 370/394; 370/474
(58) Field of Classification Search .................. 370/392, 370/394, 474
See application file for complete search history.

(56) References Cited

U.S. PATENT DOCUMENTS

| 5,541,920 | A | 7/1996 | Angle et al. |
| 5,826,032 | A | 10/1998 | Finn et al. |
| 7,006,525 | B1* | 2/2006 | Jha ............................. 370/466 |
| 7,415,652 | B1* | 8/2008 | Szeremi ...................... 709/230 |
| 2002/0141448 | A1 | 10/2002 | Matsunaga |
| 2003/0188015 | A1* | 10/2003 | Lee et al. ..................... 709/238 |
| 2004/0093521 | A1* | 5/2004 | Hamadeh et al. ............ 713/201 |
| 2005/0111437 | A1* | 5/2005 | Maturi ........................ 370/352 |
| 2005/0169272 | A1 | 8/2005 | Lo et al. |
| 2005/0243729 | A1* | 11/2005 | Jorgenson et al. ........... 370/241 |
| 2007/0183425 | A1* | 8/2007 | Lim et al. .................... 370/392 |
| 2008/0298244 | A1* | 12/2008 | Corl et al. ................... 370/235 |
| 2009/0185574 | A1* | 7/2009 | Chapman et al. ............ 370/419 |

FOREIGN PATENT DOCUMENTS

JP     9-204376 A     8/1997

OTHER PUBLICATIONS

D. Burchfiel, W. Plummer and R.S. Tomlinson, LEN#18 Proposed Revisions to the TCP, Oct. 26, 1976, 3. Checksum and Fragmentation.

* cited by examiner

*Primary Examiner*—Andrew Lee
(74) *Attorney, Agent, or Firm*—Canon USA Inc IP Division

(57) ABSTRACT

A delay in packet output due to packet fragmentation processing is reduced. If input data is output upon being subjected to fragmentation processing, fragmented data, from among a plurality of fragmented data items fragmented based upon a set value in an MTU register, which belongs to a first fragmented packet containing information that is based upon all fragmented packets is stored in a fragment buffer. After all fragmented packets from a second fragmented packet onward to which other fragmented data items belong are output, the first fragmented packet is output.

10 Claims, 5 Drawing Sheets

COMMUNICATION APPARATUS AND METHOD

BACKGROUND OF THE INVENTION

1. Technical Field

The present invention relates to a communication apparatus and method and, more particularly, to a communication technique for fragmenting and transferring data.

2. Background Art

There are systems that employ networks compliant with the IEEE 802.3 standard and use the IP (Internet Protocol) as a communication protocol. TCP (Transmission Control Protocol) and UDP (User Datagram Protocol), etc., are available as protocols in layers higher than the IP layer. Further, layers below the IP layer are composed of LLC (Logical Link Control: IEEE 802.2) and MAC (Media Access Control) layers and PHY (physical) layers, etc.

According IP specifications, the amount of data in one IP packet can be defined up to a maximum of 65535 octets. In general, however, in order for a finite network band to be used equitably among stations connected to a network, it is so arranged that the size of a packet transferred is limited to avoid the effects of pressure on band by specific stations.

In the IP layer, the maximum data size capable of being transferred by a single transmission frame in various networks is defined as the MTU (Maximum Transfer Unit). In general, often the MTU is set to 1492 octets in the case of Ethernet (registered trademark) at 10 Mbps (megabits per second) to 1 Gbps (gigabits per second), and to 576 octets in the case of a dial-up connection using the X.25 protocol with a telephone line. With Ethernet (registered trademark) at 1 to 10 Gbps, there are instances where a larger MTU is set to manifest the merits of broadband properties.

The MTU will now be described using the IP packet format. The defined length of the MTU corresponds to the maximum length of the IP packet in a frame (e.g. Ethernet frame). When this is output as an Ethernet (registered trademark) frame, 14 octets of a MAC header are appended to the beginning of the IP packet and four octets of an FCS (Frame Check Sequence) are appended to the tail end of the packet.

In a network system of the kind illustrated in FIG. 3, a case will be described in which a host A 301 belonging to a network A 311 transmits a packet to a host B 302 belonging to a network B 312 via a network C 313. Assume that the MTU is 1492 octets in each of the networks A 311 and B 312 and 576 octets in the network C 313. A router A 321 interconnects the network A 311 and network C 313, and a router B 322 interconnects the network B 312 and network C 313.

Since the MTUs of the networks A 311 and B 312 to which the hosts A 301 and B 302, respectively, belong are 1492 octets each, the hosts A 301 and B 302 generate IP packets of a maximum of 1492 packets. If the host A 301 sends a 1492-octet IP packet to the host B 302, therefore, then the router A 321 executes processing to fragment the IP packet. In other words, the router A 321 executes fragmentation processing in such a manner that the size of each individual IP packet that is output to the network C 313 will be 576 octets or less.

More specifically, the router A 321 fragments the IP packet from the host A 301 into three IP packets, as illustrated in FIGS. 4A to 4D, in order to sent it to the network C 313. FIG. 4A illustrates the original IP packet sent from the host A 301 to the router A 321. FIGS. 4B, 4C and 4D, on the other hand, illustrate IP packets, which are the result of fragmentation processing, sent from the router A 321. It should be noted that in order to distinguish between the original IP packet and the IP packets transmitted upon being fragmented from the original IP packet, an IP packet that has undergone fragmentation processing shall be referred to as a "fragmented IP packet" below.

The IP packet shown in FIG. 4A comprises an IP header, a UDP header and a payload. The packet length of this IP packet is 1492 octets.

The first fragmented IP packet shown in FIG. 4B also comprises an IP header, a UDP header and a payload. The packet length of this fragmented IP packet, however, is 576 octets. Further, an MF (More Fragments) flag defined within the IP header has been set to "1". It should be noted that setting the MF flag to "1" indicates the existence of a succeeding fragmented IP packet.

An ID that is identical to an ID set in the IP header of the first fragmented IP packet illustrated in FIG. 4B is added on within the IP header of the second fragmented IP packet illustrated in FIG. 4C. The second fragmented IP packet has a packet length of 576 octets identical with that of the first fragmented IP packet. Further, the MF flag defined in the IP packet is set to "1", and a value to the effect that an offset value is 72 (indicates 576 octets because of counted in units of 8 octets) is appended. It should be noted that the offset value indicates the position in the original IP packet of data contained in the fragmented IP packet.

Setting the MF flag to "0" in the third fragmented IP packet illustrated in FIG. 4D indicates that a succeeding fragmented IP packet does not exist. That is, "0" indicates that this fragmented IP packet is the terminus of the plurality of fragmented IP packets generated by fragmentation processing. The third fragmented IP packet has an IP datagram length of 364 octets and the offset thereof is set to 141 (indicates 1128 octets).

Since the IDs set in the IP headers of the first to third fragmented IP packets are all the same ID, it is possible to identify that the original is a packet that has been generated by fragmenting the same IP packet.

Thus, the IP packet that has been transmitted from the host A 301 is fragmented into three fragmented IP packets and sent to the router B 322 via the host B 302 by the router A 321, and the IP packet is transmitted in the fragmented state from the router B 322 to the host B 302. When the host B 302 receives the three fragmented IP packets, is reconstructs the original IP packet by referring to the ID, MF flag and offset value in each of the IP headers.

Packet fragmentation processing is not limited to the above-described case but also occurs in a case where the host (station) transmits a datagram that is large in comparison with the MTU of the network at the output destination. An example of fragmentation processing is disclosed in, e.g., the specification of Japanese Patent Application Laid-Open No. 9-204376.

However, a certain problem arises in transfer in a case where processing for fragmenting an IP packet is executed in a router according to the prior art described above. Specifically, a checksum of the overall data that has been input is described in the UDP header contained in the first fragmented IP packet. Consequently, the first fragmented IP packet cannot be transmitted unless all of the data is collected in the router. The problem which results is that as the amount of data input increases, a delay in the output of packets due to fragmentation processing lengthens.

DISCLOSURE OF INVENTION

The present invention has been devised to solve this problem and provides a technique that makes it possible to shorten output delay in transfer of packets subjected to fragmentation processing.

Accordingly, an object of the present invention is to solve the aforementioned problems of the prior art.

The present invention comprises constitution following as an exclusive step achieving the foregoing objects.

A communication apparatus for transmitting data to a network in a predetermined packet format, comprising: fragmentation means for fragmenting input data into a plurality of fragmented data items; generating means for generating data information derived based upon the plurality of fragmented data items; memory means for storing a fragmented data item, which will be contained in a packet that contains the data information, from among the plurality of fragmented data items; and transmission control means for outputting the packet, which contains the data information and the fragmented data item that has been stored in the memory means, to the network after packets containing fragmented data items other than the fragmented data item that has been stored in the memory means are output successively to the network.

A communication method for transmitting data to a network in a predetermined packet format, comprising the steps of: fragmenting input data into a plurality of fragmented data items; generating data information derived based upon the plurality of fragmented data items; storing fragmented data item, which will be contained in a packet that contains the data information, in a memory unit from among the plurality of fragmented data items; and outputting the packet, which contains the data information and the fragmented data item that has been stored in the memory unit, to the network after packets containing fragmented data items other than the fragmented data item that has been stored in the memory unit are output successively to the network.

In accordance with the present invention, in a case where input data is fragmented into multiple items of fragmented data and output to a communication network, a packet containing fragmented data having appended information that is based upon all of the fragmented data is output last. The other fragmented packets are output successively whenever the fragmented data that belongs to them is obtained.

By virtue of this arrangement, fragmented packets of only fragmented data can be output successively without waiting for output of the fragmented packet that contains the information based upon all fragmented data.

Further features of the present invention will become apparent from the following description of exemplary embodiments (with reference to attached drawings).

BEST MODE FOR CARRYING OUT THE INVENTION

An embodiment of the present invention will now be described with reference to the drawings.

Figure 1:
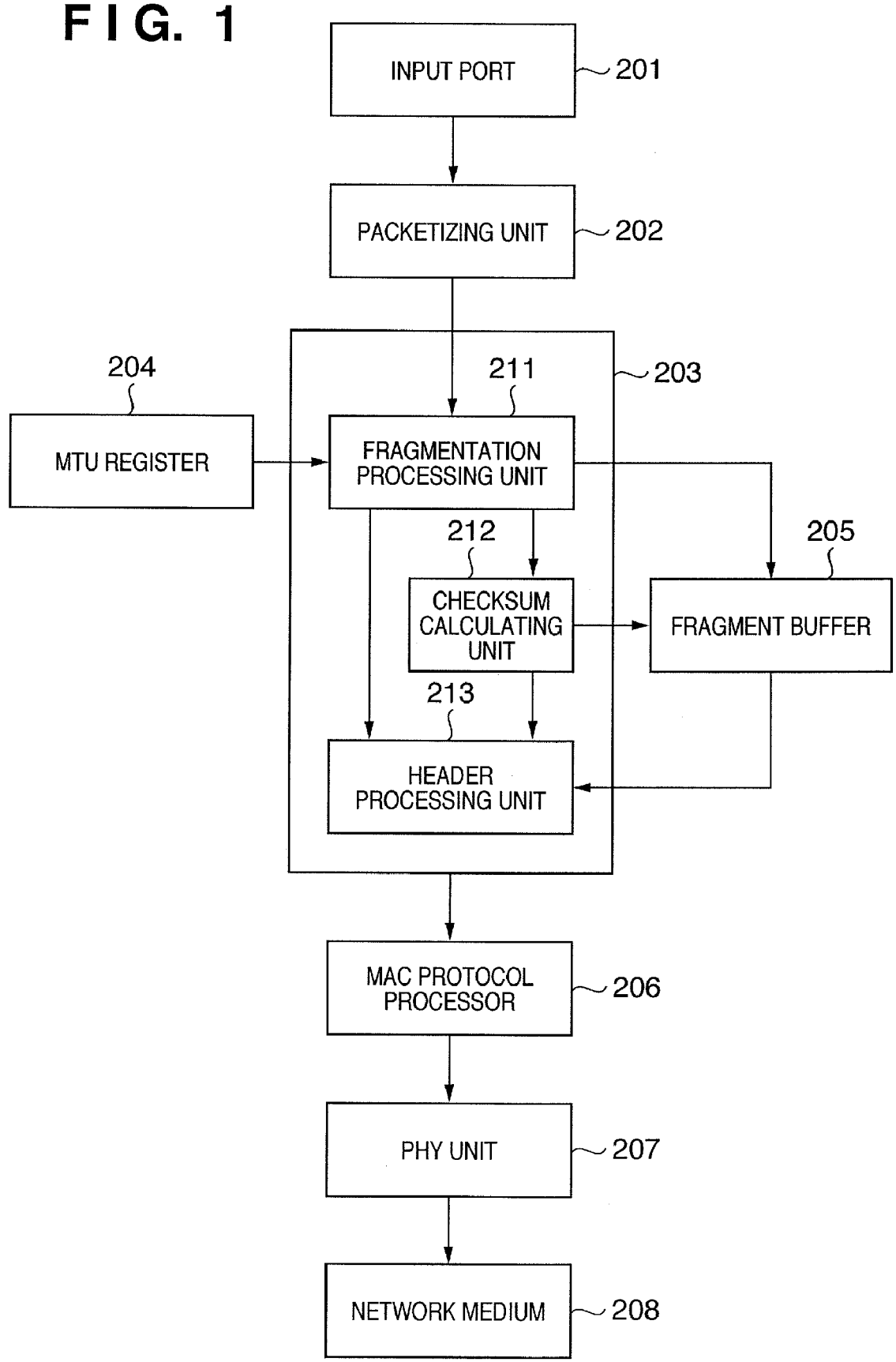
FIG. 1 is a block diagram illustrating an example of the structure of a communication apparatus according to an embodiment of the present invention.

FIG. 1 is a block diagram illustrating an example of the structure of a communication apparatus according to an embodiment of the present invention.

As shown in FIG. 1, the apparatus includes an input port 201 to which data is input; a packetizing unit 202 for making data, which has been input from the input port 201, conform to a certain fixed size; and an IP processor 203 for executing protocol processing that places data, which is output from the packetizing unit 202, in an IP packet. The IP processor 203 includes a fragmentation processing unit 211, a checksum calculating unit 212 and a header processing unit 213.

By referring to the value of an MTU set and held in an MTU register 204 (described later), the fragmentation processing unit 211 determines whether data supplied from the packetizing unit 202 is to undergo fragmentation processing.

More specifically, the fragmentation processing unit 211 compares the size of data supplied from the packetizing unit 202 and the value held in the MTU register 204. If the fragmentation processing unit 211 determines that the size of the data from the packetizing unit 202 is greater than the set value in the MTU register 204, then the fragmentation processing unit 211 fragments the data from the packetizing unit 202 into a plurality of items of fragmented data in such a manner that the data size will not exceed the set value.

On the basis of the data supplied via the fragmentation processing unit 211, the checksum calculating unit 212 calculates the checksum of the overall data, which checksum will be described in a UDP header. The header processing unit 213 appends a UDP header/IP header to the data supplied via the fragmentation processing unit 211. For example, the header processing unit 213 generates a UDP header containing the checksum calculated by the checksum calculating unit 212 and attaches the header to the beginning of the data.

The MTU register 204 holds the set value of the MTU in the IP layer. If fragmentation processing has occurred in the IP processor 203 based upon the setting in the MTU register 204, a fragment buffer 205 holds a first item of fragmented data that has been generated by fragmentation processing. In other words, if a fragment has been produced, the fragment buffer 205 holds the fragmented data contained in the first fragmented packet that contains the UDP header to which the checksum has been appended.

A MAC protocol processor 206 executes MAC-layer protocol processing, and a PHY (physical) unit 207 executes physical-layer processing. The latter delivers its output to a network medium, which corresponds to a cable or the like.

The operation of the communication apparatus according to this embodiment will now be described.

When data that has been transmitted from an external data generating apparatus or data that has been read from an external storage unit is input from the input port 201, this input data is packetized into data of a certain fixed size in the packetizing unit 202. The size of the data packetized at this time depends upon the data generating apparatus connected.

The data that has been packetized by the packetizing unit 202 is supplied to the IP processor 203, which proceeds to append UDP and IP headers. The size of the IP packet is defined by the set value thereof (the MTU) applied by the MTU register 204. Accordingly, each of the processing units constructing the IP processor 203 executes the processing, which is set forth below, in accordance with a size obtained by adding the size of the UDP header (usually 8 bytes) and the size of the IP header (usually 20 bytes) to the size of the data generated by the packetizing unit 202.

If the size obtained by adding the sizes of the UDP and IP headers to the size of the input data is smaller than the set value in the MTU register 204, then this data is furnished with the UDP header, which includes the checksum of the overall data, and with the IP header and is supplied to the MAC protocol processor 206 as an IP packet. A MAC header is thenceforth appended by the MAC protocol processor 206, a conversion is made to an electrical/optical signal by the PHY unit 207, which is a physical-layer device, and the resultant signal is output to the network medium 208. As mentioned above, the data that has entered from the input port 201 is transmitted to the network medium 208.

If the size obtained by adding the sizes of the UDP and IP headers to the size of the input data is greater than the set value in the MTU register 204, on the other hand, then fragmentation processing occurs. Specifically, based upon the size of the MTU set in the MTU register 204, the IP processor 203 sections off the data from the beginning of the data that has entered from the packetizing unit 202 and attaches a provisional UDP header to this data.

Since all of the data has not yet been collected at this time, however, the checksum calculating unit 212 has not finished calculating the overall data checksum, which is information included in the UDP header. As a consequence, the leading (first) fragmented packet to which the UDP header information is appended cannot be transmitted. Accordingly, the IP processor 203 stores and holds this leading fragmented packet, with the provisional UDP header appended thereto, in the fragment buffer 205 temporarily.

Next, on the basis of the size of the MTU, the IP processor 203 sections off, as the second item of data, the data from the position that follows the position at which the first item of data was sectioned off previously. The IP processor 203 then appends an IP header to this sectioned off data, generates a fragmented IP packet and outputs this packet to the MAC protocol processor 206. The fragmented IP packet containing the second item of data has a MAC header appended thereto by the MAC protocol processor 206, the resultant packet is output to the network medium 208 through the PHY unit 207 serving as a physical-layer device.

In the manner described above, the IP processor 203 successively sections off data from the second item of data onward, thereby generating IP packets, and outputs the packets to the MAC protocol processor 206. The latter appends a MAC header to each packet. The data with the appended MAC header is successively output to the network medium 208 via the PHY unit 207.

Output is thus performed up to the tail end of the data that has entered from the packetizing unit 202. If output has been completed, the IP processor 203 appends the result of the checksum obtained by the checksum calculating unit 212 (namely the checksum of the data that has entered from the packetizing unit 202) to the provisional UDP header of the fragmented packet stored and held in the fragment buffer 205. Furthermore, the fragmented packet is output from the IP processor 203 to the MAC protocol processor 206. After the MAC header is appended to it, the packet is output to the network medium 208 via the PHY unit 207.

In other words, the fragmentation processing unit 211 in the IP processor 203 compares the set value in the MTU register 204 with the amount of data that is input and determines whether the data input is to be fragmented or not. If the result of the comparison is that the input data is to be fragmented, then the IP processor 203 stores and holds the fragmented data, which belongs to the first fragmented packet that includes the UDP header, in the fragment buffer 205. After successively outputting the fragmented packets from the succeeding second fragmented packet onward and transmitting the final fragmented packet, the IP processor 203 appends the UDP header in which the checksum is described to the first fragmented packet and outputs the first fragmented packet.

That is, in a case where entered data is subjected to fragmentation processing and output, the fragmentation processing unit 211 first appends a provisional UDP header to the first fragmented packet and holds this first fragmented packet in the fragment buffer 205. Fragmented packets from the second onward, on the other hand, are output by the fragmentation processing unit 211 successively. At this time the checksum calculating unit 212 concurrently calculates the checksum that is to be appended to the UDP header contained in the first fragmented packet. Following the end of transmission of the final fragmented packet, the header processing unit 213 generates the UDP header to which the calculated checksum has been appended and completes the first fragmented packet. The IP processor 203 then transmits the first fragmented packet.

Figure 2:
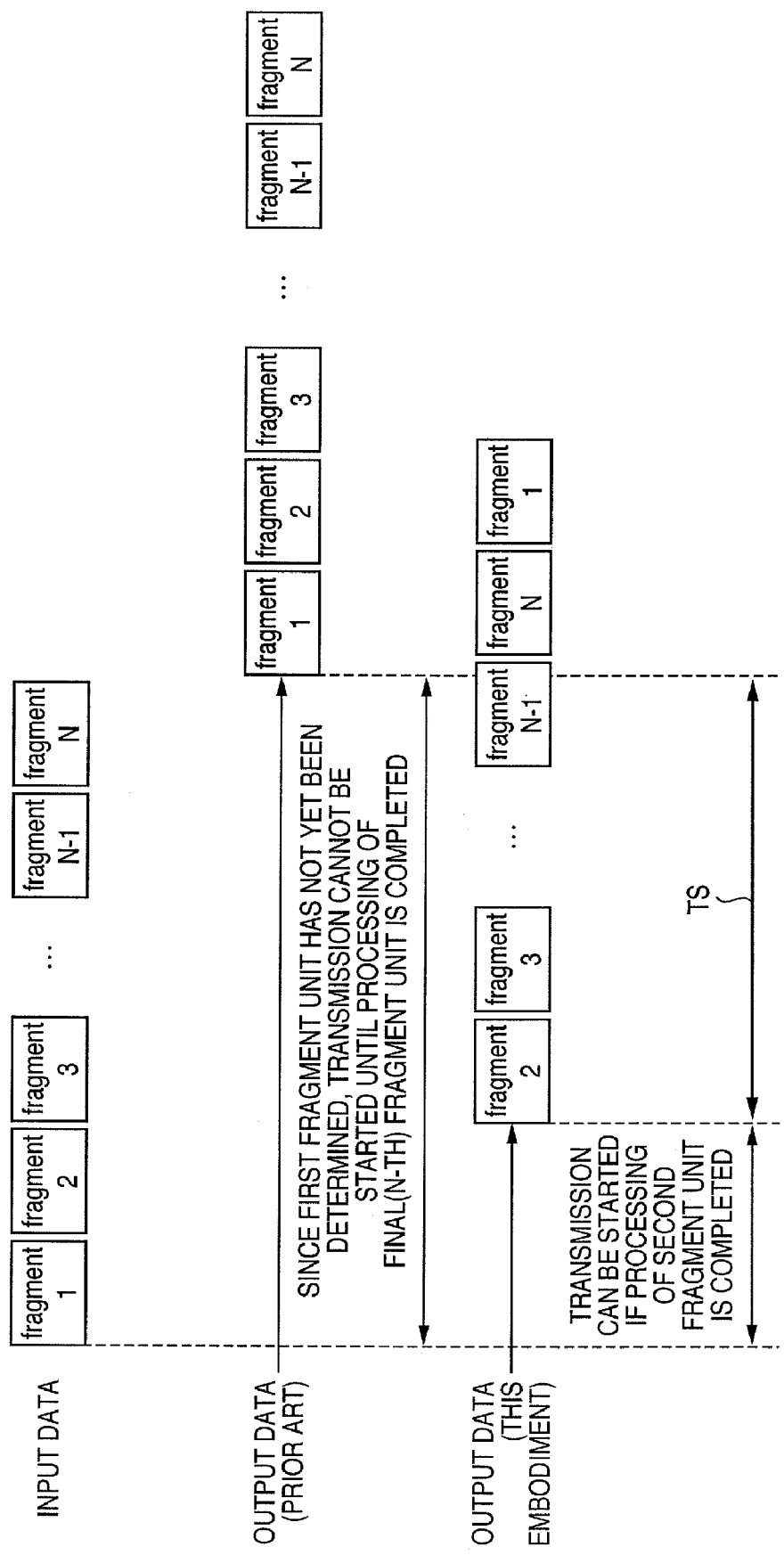
FIG. 2 is a diagram useful in describing processing for transmitting fragmented packets in this embodiment.
Figure 3:
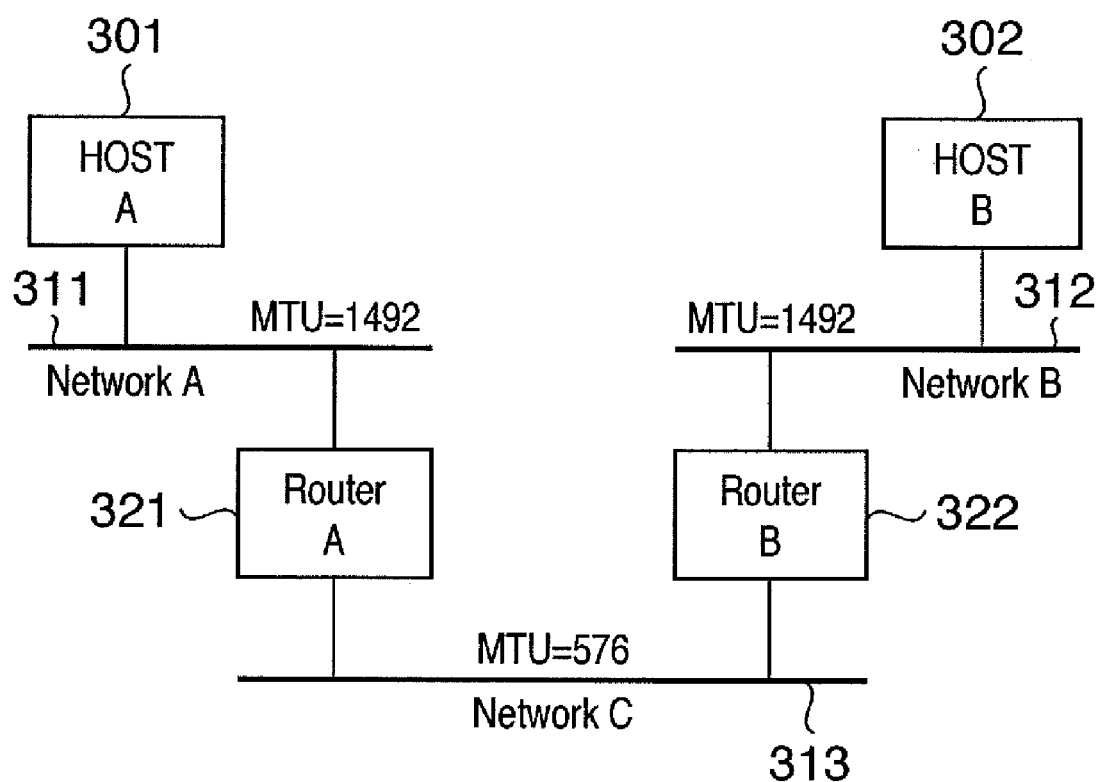
FIG. 3 is a diagram illustrating an example of a network system.
Figure 4:
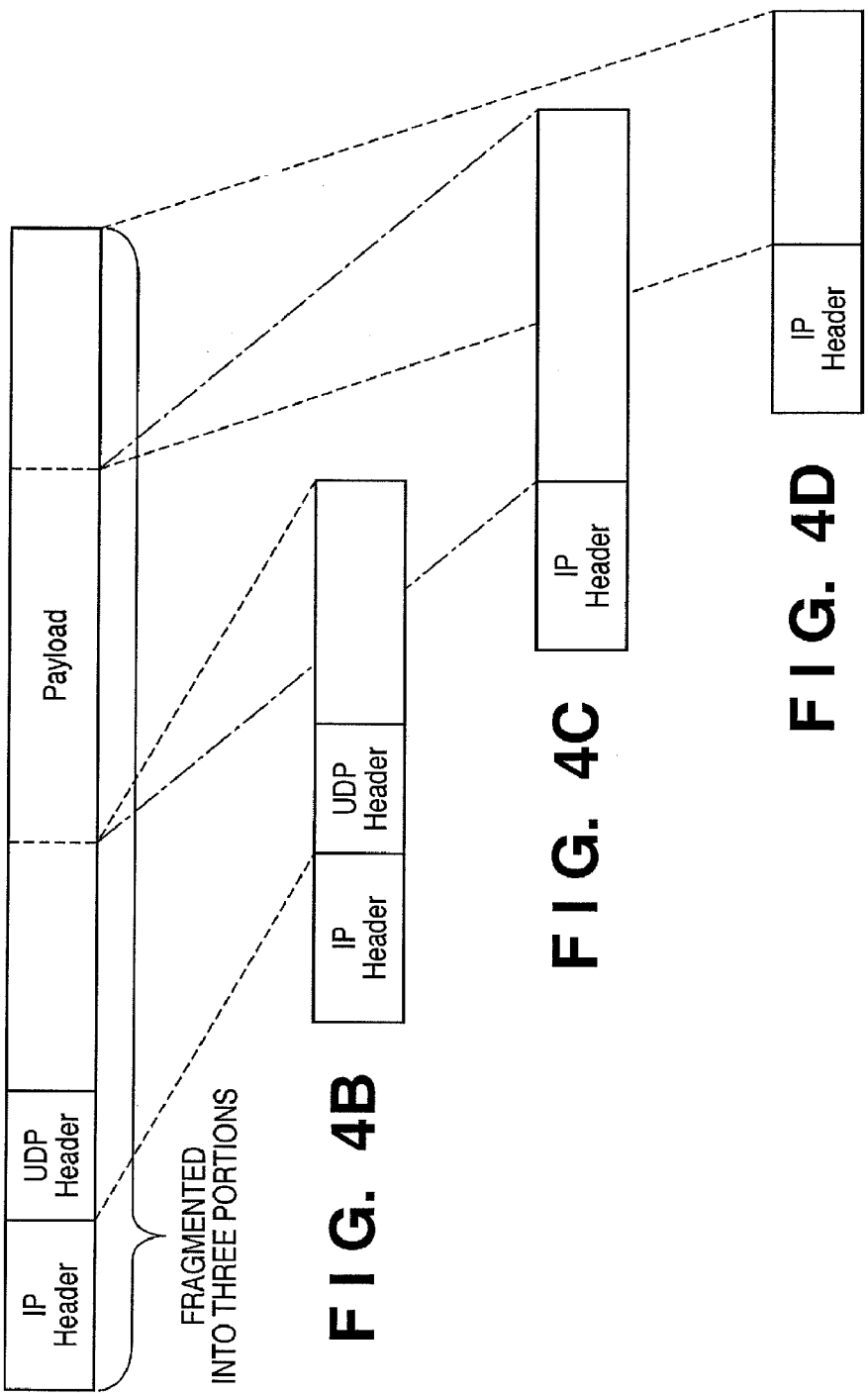
FIGS. 4A to 4D are diagrams useful in describing fragmentation of an IP packet.

FIG. 2 is a diagram useful in describing the processing for transmitting fragmented packets in this embodiment. FIG. 2 illustrates a case where input data is output upon being divided into N fragments. This is illustrated together with the transmission processing of the prior art in order to make a comparison with this embodiment. It should be noted that although the input data is actually input as a single item of data, it is illustrated as being fragmented in FIG. 2 in order to make correspondence with the output data easier to comprehend.

In accordance with this embodiment, fragmented packets from the second onward can be output successively without waiting for output of the first fragmented packet to which the UDP header is appended. Accordingly, as clearly illustrated in FIG. 2, delay time up to output of packets in fragmentation can be shortened by TS in comparison with the prior art. Further, time up to completion of transmission of the UDP datagram can also be shortened. This fragment method can apply to protocols such as TCP, ICMP and other protocols above IP Layer.

Further, in accordance with this embodiment, if entered data is to be output upon being fragmented, then fragmented packets from the second onward are output as soon as input of data belonging to these fragmented packet is completed. This means that the required amount of buffer used is approximately double the size of MTU. As a result, the amount of storage needed for fragmentation processing can be reduced by a wide margin in comparison with the prior art.

Other Embodiments

In order that various devices that are to implement the functions of the foregoing embodiment may be operated, a computer within an apparatus or system connected to these various devices is supplied with the program code of software for implementing the functions of the embodiment, and the various devices are caused to operate in accordance with the program that has been stored in the computer (CPU or MPU) of the system or apparatus. Such an implementation also falls within the scope of the present invention.

In this case, the program codes per se of the software implement the functions of the foregoing embodiment, and the program codes per se constitute the invention. Further, the means for supplying the computer with the program codes, e.g., the recording medium on which the program codes have been stored, constitutes the present invention. By way of example, a flexible disk, hard disk, optical disk, magneto-optical disk, CD-ROM, magnetic tape, non-volatile memory card and ROM, etc., can be used as the recording medium that stores the program codes.

Further, not only are the functions of the foregoing embodiment implemented by executing the supplied program codes in a computer, but it also goes without saying that the program codes are included in the embodiments of the invention also in a case where the functions of the foregoing embodiment are implemented by cooperation between the program codes and an operating system or application software running on the computer.

Furthermore, it goes without saying that the present invention also covers a case where after the supplied program codes have been stored in a memory provided on a function expansion board of a computer or in a function expansion unit that has been connected to the computer, a CPU or the like provided on the function expansion board or function expansion unit performs all or a part of the actual processing based upon the indications in the program codes, whereby the functions of the foregoing embodiment are implemented.

Figure 5:
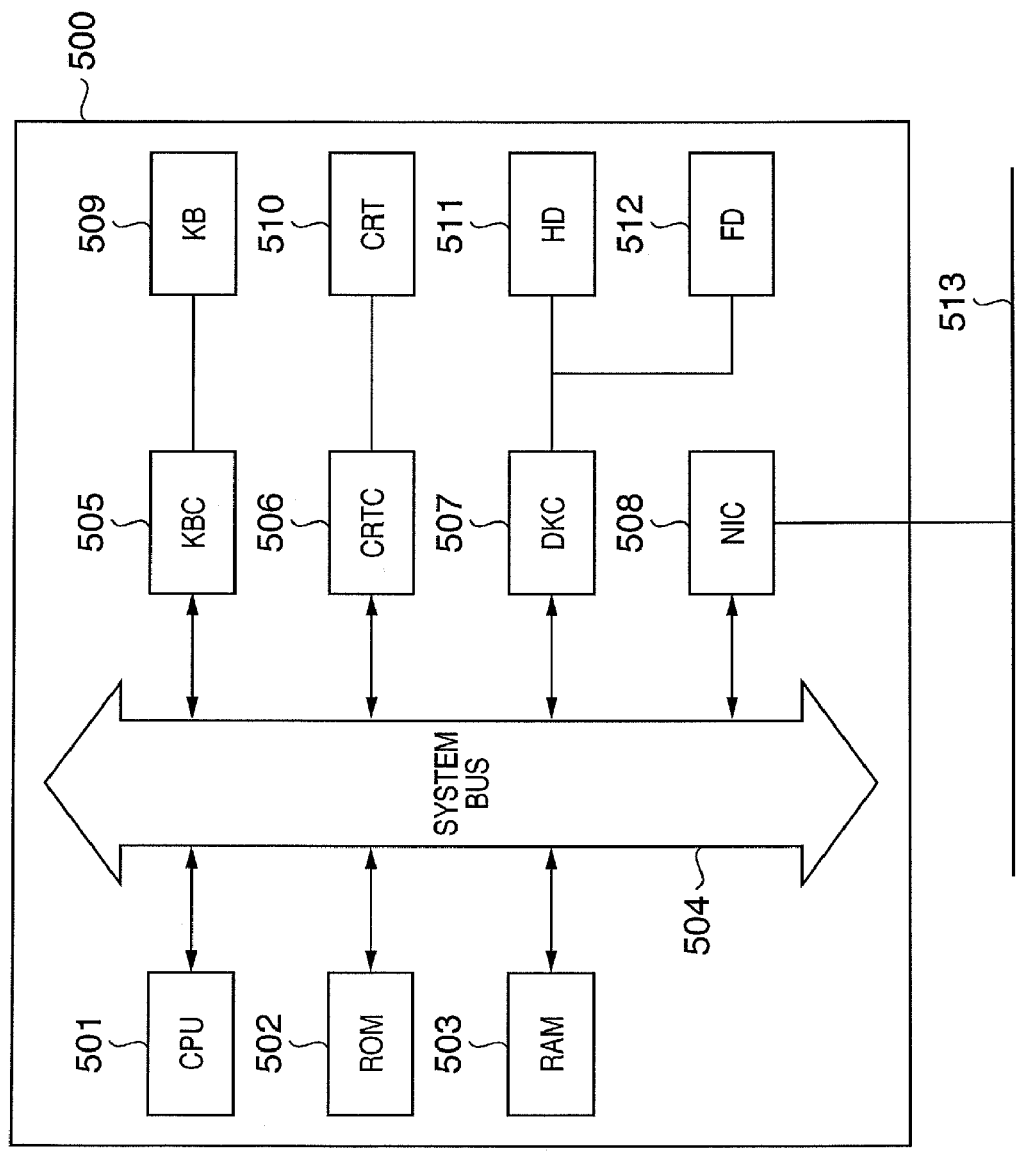
FIG. 5 is a block diagram illustrating the functions of a computer that is capable of implementing the communication apparatus according to this embodiment.

For example, the communication apparatus illustrated in the above-described embodiment has a computer function 500 of the kind illustrated in FIG. 5, and the operation of the foregoing embodiment is implemented by a CPU 501.

As illustrated in FIG. 5, the computer function 500 has the CPU 501, a ROM 502 and a RAM 503. The computer function 500 has a keyboard controller (KBC) 505 for controlling a keyboard (KB) 509, and a CRT controller (CRTC) 506 for controlling a CRT display (CRT) 510 serving as a display unit. The computer function 500 further has a disk controller (DKC) 507 for controlling a hard disk (HD) 511 and a flexible disk (FD) 512, and a network interface card (NIC) 508. The CPU 501, ROM 502, RAM 503, KBC 505, CRTC 506, DKC 507 and NIC 508 are interconnected via a system bus 504 so as to be capable of communicating with one another.

The CPU 501 exercises overall control of the components connected to the system bus 504 by executing software that has been stored in the ROM 502 or hard disk 511 or software supplied from the flexible disk 512. That is, the CPU 501 executes a processing program, which is for performing the operations described above, upon reading the program out of the ROM 502, hard disk 511 or flexible disk 512, thereby exercising control for implementing the operation of the foregoing embodiment. The RAM 503 functions as a main memory or work area, etc., of the CPU 501.

The keyboard controller 505 controls the input of commands from the keyboard 509 or from a pointing device, not shown. The CRT controller 506 controls the display presented on the CRT 510. The disk controller 507 controls access to the hard disk 511 and flexible disk 512 that store a booting program, various applications, user files, a network management program and the processing program in the foregoing embodiment. The network interface card 508 exchanges data bidirectionally with other devices on the network 513.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2005-319801, filed on Nov. 2, 2005 which is hereby incorporated by reference herein in its entirety.

The invention claimed is:

1. A communication apparatus for transmitting data to a network in a predetermined packet format, comprising:
fragmentation means for fragmenting input data into a plurality of fragmented data items;
generating means for generating data information derived based upon the plurality of fragmented data items;
memory means for storing a fragmented data item, which will be contained in a packet that contains the data information, from among the plurality of fragmented data items; and
transmission control means for outputting the packet, which contains the data information and the fragmented data item that has been stored in said memory means, to the network after packets containing fragmented data items other than the fragmented data item that has been stored in said memory means are output successively to the network.

2. The apparatus according to claim 1, further comprising setting means for setting a maximum amount of data of the fragmented data item;
wherein said fragmentation means compares the amount of input data and the maximum amount of data and, if the amount of input data is greater than the maximum amount of data, fragments the input data in such a manner that the amount of data in each fragmented data item will fall below the maximum amount of data.

3. The apparatus according to claim 2, wherein the maximum amount of data is the Maximum Transfer Unit (MTU) for the network.

4. The apparatus according to claim 1, wherein if it is assumed that said fragmentation means fragments the input data into m fragmented data items and an n-th (where n is an integer and is equal to or greater than 1 and less than m) fragmented data item from the beginning of the input data is an n-th fragmented data item, then said transmission control means successively outputs packets containing fragmented data items other than the first fragmented data item to the network and, after the packet containing the m-th fragmented data item is output, outputs the packet containing the first fragmented data item and the data information.

5. The apparatus according to claim 4, wherein the predetermined packet format is the UDP/IP format; and
the data information is a value of an error detection code derived based upon all m fragmented data items and included in a UDP header.

6. The apparatus according to claim 4, wherein the predetermined packet format is the TCP/IP format; and
the data information is a value of an error detection code derived based upon all m fragmented data items and included in a TCP header.

7. The apparatus according to claim 4, wherein the predetermined packet format is the ICMP format; and
the data information is a value of an error detection code derived based upon all m fragmented data items and included in an ICMP header.

8. The apparatus according to claim 2, wherein if it is assumed that said fragmentation means fragments the input data into m fragmented data items and an n-th (where n is an integer and is equal to or greater than 1 and less than m) fragmented data item from the beginning of the input data is an n-th fragmented data item, then said transmission control means successively outputs packets containing fragmented data items other than the first fragmented data item to the network and, after the packet containing the m-th fragmented data item is output, outputs the packet containing the first fragmented data item and the data information.

9. The apparatus according to claim 3, wherein if it is assumed that said fragmentation means fragments the input data into m fragmented data items and an n-th (where n is an integer and is equal to or greater than 1 and less than m) fragmented data item from the beginning of the input data is an n-th fragmented data item, then said transmission control means successively outputs packets containing fragmented data items other than the first fragmented data item to the network and, after the packet containing the m-th fragmented data item is output, outputs the packet containing the first fragmented data item and the data information.

10. A communication method for transmitting data to a network in a predetermined packet format, comprising the steps of:

fragmenting input data into a plurality of fragmented data items;

generating data information derived based upon the plurality of fragmented data items;

storing fragmented data item, which will be contained in a packet that contains the data information, in a memory unit from among the plurality of fragmented data items; and outputting the packet, which contains the data information and the fragmented data item that has been stored in the memory unit, to the network after packets containing fragmented data items other than the fragmented data item that has been stored in the memory unit are output successively to the network.

* * * * *